(No Model.)

E. E. GOLD.
HOSE COUPLING.

No. 349,991. Patented Sept. 28, 1886.

WITNESSES
John Becker
Jno. E. Gavin

INVENTOR
Edward E. Gold
by Chas. M. Higgins
Attorney

UNITED STATES PATENT OFFICE.

EDWARD E. GOLD, OF NEW YORK, N. Y.

HOSE-COUPLING.

SPECIFICATION forming part of Letters Patent No. 349,991, dated September 28, 1886.

Application filed November 19, 1885. Serial No. 183,250. (No model.)

*To all whom it may concern:*

Be it known that I, EDWARD E. GOLD, a citizen of the United States, residing at New York city, county and State of New York, have invented certain new and useful Improvements in Hose-Couplings, of which the following is a specification.

My invention is more especially designed for a steam hose-coupling to be used between the ends of railway-cars in a train, so as to connect the heating-pipe of one car to that of the next car or to the engine; and my invention relates to that class of couplings formed of two cranked bends or elbows fitting end to end in the form of a bisected S, the ends engaging together by a partial rotary motion, and a form of bayonet-fastening.

My improvement consists in certain details of construction which render the coupling very strong, simple, and efficient, as hereinafter fully set forth.

Figure 1:
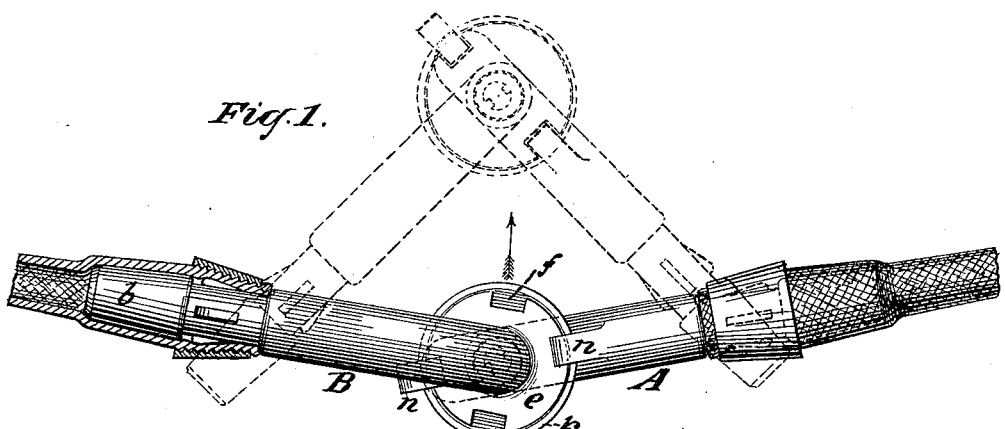
Figure 2:
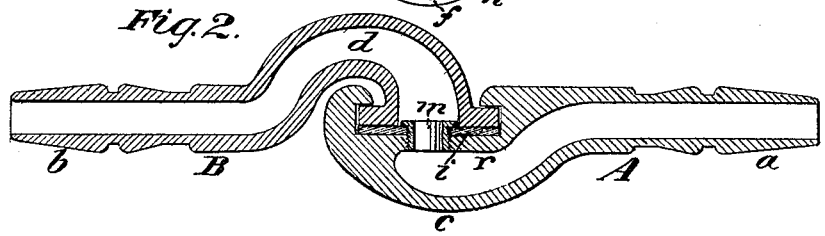
Figure 3:
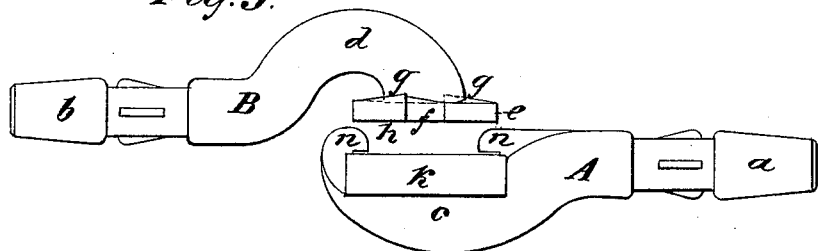
Figure 4:
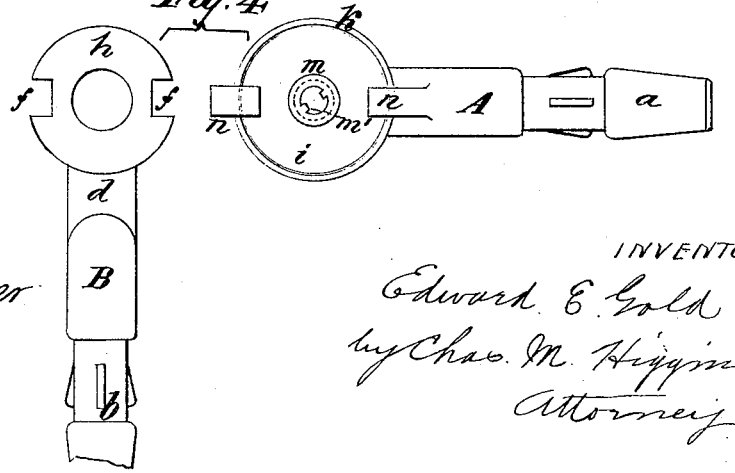

In the drawings annexed, Figure 1 presents a side elevation of my improved coupling in the position assumed when locked together to connect the hose from car to car. Fig. 2 is a longitudinal section or sectional plan of the locked coupling. Fig. 3 is an exterior plan of the two halves separated. Fig. 4 is an elevation of the two separated halves viewed in the direction of their meeting faces.

In the drawings, A indicates what may be termed the "female" half of the coupling, and B the "male" half. Each section is a simple tubular casting, straight at its outer end and formed with a conical and ribbed shank, $a$ $b$, respectively, to connect with the hose and curved into the form of a cranked bend or elbow, $c$ $d$, respectively, at their inner meeting ends, which junction together in the form of an S-trap, as seen best in Figs. 2 and 3. The male half B has a circular flange, $e$, at its junction end, with two notches, $f$ $f$, in its periphery at diametrically-opposite sides, as shown in Figs. 1, 3, and 4. The top or outer surface of the flange is formed with two inclines, $g$ $g$, or sections of screw-threads inclining in opposite directions from said notches, as shown best in Fig. 3, while the under or junction surface, $h$, of the flange is level and smooth, as seen best in Figs. 2, 3, and 4. Now, the female section A is formed with a rimmed cup or socket, $k$, to receive the flange $e$, as seen in Figs. 1 and 2. The socket $k$ has a smooth and level base, $r$, as seen in Fig. 2, on which is placed a packing-washer, $i$, against which the flange $e$ fits when the sections are coupled together, as seen in Fig. 2. The base $i$ of the socket has a central opening in line with the bore or passage of the sections, to allow a free passage to the steam when the two sections are coupled, and in this opening is screwed a small shouldered screw-thimble, $m$, (see Figs. 2 and 4,) whose shoulder bears firmly on the washer $i$, and thus holds it securely in place. The bore or interior of the thimble $m$ is provided with one or more notches or ribs, $m'$, to afford grasp to a wrench or tool for screwing the thimble in and out, as will be understood. Now, referring again to the several figures, it will be seen that the socket end of the section A is formed with two projections, $n$ $n$, which extend radially inward at diametrically-opposite sides of the socket-rim $k$, and above the same, as well shown in the drawings, which projections correspond with the notches $f$ $f$ in the flange $e$. It may now be seen, referring to Fig. 1, that to couple the sections together it is only necessary to insert the flanged male section A in the socket $k$ in such position that the notches $f$ coincide with the projections $n$ $n$, and to then press the flange against the washer $i$, and partly revolve the flange on the socket-section. This partial revolution will cause the inclines $g$ $g$ on the top of the flange to pass under the projections $n$ $n$ with a powerful wedging or screw action, which will force the flange $e$ firmly against the washer $i$, and thus render the joint of the coupling perfectly secure and steam-tight.

It will be readily seen on reference to Fig. 1 that in order to couple the sections, as described, when attached to the hose between the meeting ends of the cars, it is only necessary to raise up the sections in an inclined position at or nearly at right angles to each other, as shown by dotted lines, in which position the notches $f$ and projections $n$ will match, and then by simply inclining or bending the sections downward, toggle-like, as shown by full lines, the flange of one section will partly rotate in the socket of the other, and the two will thereby become clamped together steam-tight with a most powerful mechanical action, combining the screw and toggle, which insures absolute tightness, and is yet performed by a most simple and easy effort of the hand, no wrench or other tool being required. It will be further seen on reference to the full lines in Fig. 1 that when thus coupled the sections assume a bent or drooping position, corresponding to the natural droop of the hose between the cars, so that the natural droop or gravitation of the hose and coupling only tends to still further tighten the coupling. On the other hand, to uncouple the parts, it is only necessary to lift and bend the coupling in an upward direction, as shown by dotted lines, which will revolve the flange so that the notches coincide with the projections and allow the parts to separate by a simple and easy motion.

The washer $i$ is preferably made of soft vulcanizable rubber—such as known as "Jenkins's packing;" but any other suitable material may be used. The faces $h$ of flange $e$ and the top of the base $r$ might be ground to fit together, and the form of these faces might be conical in the manner of valve and seat; but the flat surfaces with packing-washer between is much simpler and cheaper, and is considered to be more durable and efficient.

It will be noted that the means of locking the coupling, consisting of the flange $e$, with its notches and screw-inclines $g$, in connection with the projections $n$ in the socket $k$, are very simple to cast, and require little or no finishing to fit the coupling together. In fact, the only mechanical work required on the sections after being cast is to turn off the bottom and sides of the socket $k$ and the face $h$ of the flange $e$, and to tap the opening to receive the thimble $m$. The inclines $g$ will generally need only a little filing, while the bearing-faces of the projections $n$ will be finished off in the act of turning out the socket $k$, as will be readily understood.

As thus made, the coupling is very strong, simple, and inexpensive, and its operation is very easy, and an absolutely tight joint is insured; and it will of course be readily understood that the coupling is not confined to steam-hose, but may be used in any other ducts for conveying other fluids or liquids for which it may be adapted.

What I claim is—

1. In a two-part or bisected coupling, the combination of the section B, having the bearing-flange $e$, with the section A, having the socket $k$, with the washer $i$ and retaining-thimble $m$, substantially as herein set forth.

2. In a two-part bisected coupling, the combination of the socket-section A, with washer $i$, thimble $m$, and projections $n$, with the section B, having the seating-flange $e$, with notches $f$ and inclines $g$, substantially as shown and described.

EDWARD E. GOLD.

Witnesses:
JNO. E. GAVIN,
CHAS. M. HIGGINS.